US009825453B2

(12) United States Patent
Lee et al.

(10) Patent No.: US 9,825,453 B2
(45) Date of Patent: Nov. 21, 2017

(54) PROTECTION MODE CONTROL CIRCUIT, SWITCH CONTROL CIRCUIT INCLUDING THE PROTECTION MODE CONTROL CIRCUIT AND POWER SUPPLY DEVICE INCLUDING THE SWITCH CONTROL CIRCUIT

(71) Applicant: FAIRCHILD KOREA SEMICONDUCTOR LTD., Bucheon-si (KR)

(72) Inventors: Won-Tae Lee, Cheonan-si (KR); Ji-Hoon Jang, Incheon (KR); Hyeong Seok Baek, Bucheon-si (KR); Hang-Seok Choi, Bedford, NH (US)

(73) Assignee: Fairchild Korea Semiconductor Ltd., Bucheon (KR)

( * ) Notice: Subject to any disclaimer, the term of this patent is extended or adjusted under 35 U.S.C. 154(b) by 55 days.

(21) Appl. No.: 14/965,125

(22) Filed: Dec. 10, 2015

(65) Prior Publication Data

US 2016/0172841 A1     Jun. 16, 2016

Related U.S. Application Data

(60) Provisional application No. 62/090,004, filed on Dec. 10, 2014.

(51) Int. Cl.
| | |
|---|---|
| *H02M 1/32* | (2007.01) |
| *H02H 3/247* | (2006.01) |
| *H02M 3/335* | (2006.01) |
| *H02M 1/00* | (2006.01) |
| *H02M 1/36* | (2007.01) |

(52) U.S. Cl.
CPC .............. *H02H 3/247* (2013.01); *H02M 1/00* (2013.01); *H02M 1/32* (2013.01); *H02M 3/33592* (2013.01); *H02M 1/36* (2013.01); *H02M 2001/0003* (2013.01); *Y02B 70/1433* (2013.01); *Y02B 70/1475* (2013.01); *Y02P 80/112* (2015.11)

(58) Field of Classification Search
CPC ...... H02M 1/32; H02M 1/36; H02M 3/33592; H02M 2001/003; H02H 1/06; H02H 3/247; H02H 3/26
See application file for complete search history.

(56) References Cited

U.S. PATENT DOCUMENTS

| | | |
|---|---|---|
| 7,773,398 B2 | 8/2010 | Kyono |
| 8,134,851 B2 | 3/2012 | Soldano et al. |

(Continued)

OTHER PUBLICATIONS

Fairchild, Advanced Secondary Side LLC Resonant Converter Controller with Synchronous Rectifier Control, Nov. 2015, 31 pages, Rev. 1.3.

(Continued)

*Primary Examiner* — Matthew Nguyen
(74) *Attorney, Agent, or Firm* — Okamoto & Benedicto LLP

(57) ABSTRACT

A protection mode control circuit includes an auto-restart counter configured to count the cycle of a first signal in a protection condition and to generate an auto-restart signal when a result of the count reaches a protection reference value and a latch mode unit configured to generate a latch mode signal for changing protection mode to latch mode when the auto-restart signal is consecutively generated by a predetermined threshold number.

20 Claims, 4 Drawing Sheets

(56) References Cited

U.S. PATENT DOCUMENTS

| | | | |
|---|---|---|---|
| 8,638,571 B2 | 1/2014 | Tschirhart et al. | |
| 8,971,059 B2 * | 3/2015 | Peng | H02M 3/3376 363/21.03 |
| 9,537,403 B2 | 1/2017 | Zhang et al. | |
| 2013/0119956 A1 * | 5/2013 | Cho | G05F 5/00 323/283 |
| 2014/0376273 A1 * | 12/2014 | Hosotani | H02M 1/32 363/21.02 |
| 2015/0326103 A1 * | 11/2015 | Choi | H02M 3/33592 363/21.02 |

OTHER PUBLICATIONS

Fairchild Semiconductor Corporation, Highly Integrated Green-Mode PWM Controller, May 2011, Rev. 1.0.1, www.fairchildsemi.com, 16 pages.

* cited by examiner

PROTECTION MODE CONTROL CIRCUIT, SWITCH CONTROL CIRCUIT INCLUDING THE PROTECTION MODE CONTROL CIRCUIT AND POWER SUPPLY DEVICE INCLUDING THE SWITCH CONTROL CIRCUIT

CROSS-REFERENCE TO RELATED APPLICATIONS

This application claims priority from U.S. Provisional Application No. 62/090,004, filed on Dec. 10, 2014 with the United States Patent and Trademark Office, the disclosure of which is incorporated herein by reference in its entirety.

BACKGROUND (a) Technical Field

Exemplary embodiments relate to a protection mode control circuit, a switch control circuit including the protection mode control circuit, and a power supply device including the switch control circuit.

(b) Description of the Related Art

Protection mode consists of auto-restart mode and latch mode. If a user instructs a control IC to switch protection mode to latch mode, protection mode is switched from auto-restart mode to latch mode when the accumulation count of the number of times of auto-restarts generated in auto-restart mode is a predetermined value or more. If a result of count is accumulated as described above, there is a problem in that protection mode is switched at an unexpected point of time.

SUMMARY

Exemplary embodiments provide a protection mode control circuit capable of stably changing protection mode, a switch control circuit including the protection mode control circuit, and a power supply device including the switch control circuit.

A protection mode control circuit according to an exemplary embodiment includes an auto-restart counter configured to count the cycle of a first signal in a protection condition and generate an auto-restart signal when a result of the count reaches a protection reference value and a latch mode unit configured to count consecutively-generated auto-restart signals and generate a latch mode signal to switch protection mode to latch mode when the count of the consecutively-generated auto-restart signals reaches a predetermined threshold number.

The protection mode control circuit further includes a latch reset unit configured to reset a result of the count of the latch mode unit when a control voltage for controlling a switching operation is maintained in a normal state during a predetermined monitoring period after the first signal reaches a predetermined level.

The latch reset unit counts the monitoring period and may reset a result of the count of the monitoring period when the control voltage is saturated or a soft start is triggered.

The protection mode control circuit further includes a protection mode controller configured to determine the protection mode in response to an externally determined mode voltage and the latch mode signal.

The auto-restart counter is configured to count an output generated based on a soft start end signal indicative of a lapse of a soft start period and a soft start initialization signal generated at a point of time at which the first signal has decreased to a predetermined first reference voltage. The auto-restart counter generates the auto-restart signal when a result of the count reaches the protection reference value. The soft start end signal may be enabled from a point of time at which the first signal reaches a predetermined level.

The auto-restart counter includes a first AND gate configured to perform an AND operation on the soft start end signal and the soft start initialization signal, a first counter configured to count an output of the first AND gate, and a first digital comparator configured to compare the output of the first counter with the protection reference value. The output of the first counter and the protection reference value may be digital signals each having a predetermined number of bits.

The latch mode unit includes a second counter configured to count the auto-restart signal and a second digital comparator configured to compare the output of the second counter with a latch reference value corresponding to the threshold number.

Each of the output of the second counter and the latch reference value may be digital signals each having a predetermined number of bits.

A switch control circuit according to an exemplary embodiment controls the switching operation of a power switch for controlling the power supply and includes a comparator configured to compare a first signal with a first reference voltage and a protection mode control circuit. The protection mode control circuit generates an auto-restart signal for restarting the switching operation of the power switch when a result of count of the cycle of the first signal reaches a protection reference value based on an output of the comparator, counts consecutively-generated auto-restart signals, and switches protection mode to latch mode when the count of consecutively-generated auto-restart signals reaches a predetermined threshold number.

The switch control circuit may generate a soft start end signal when the first signal increases and reaches a predetermined threshold voltage. The protection mode control circuit may count a result of an AND operation on the soft start end signal and an output of the comparator and generate the auto-restart signal when the count result reaches the protection reference value.

The protection mode control circuit may generate a latch mode signal for changing the protection mode to the latch mode when a result of the counting the consecutively generated auto-restart signals reaches a predetermined latch reference value.

The protection mode control circuit may reset a result of the count of the consecutively generated auto-restart signals when a control voltage based on an output voltage generated by the power supply is maintained in a normal state during a predetermined monitoring period after a lapse of a soft start period.

The switch control circuit may further include a switch having one end coupled to a capacitor for generating the first signal, a clamping unit coupled to the other end of the switch, and a monitoring unit configured to generate a saturation signal and turn off the switch when the control voltage is saturated.

The protection mode control circuit includes a counter configured to count a period in which a reset signal has a first level, the reset signal being based on a soft start end signal generated after a lapse of the soft start period and the saturation signal. The counter generates a reset latch signal for resetting a result of the count of the consecutively generated auto-restart signals when the count reaches a value corresponding to the monitoring period. The result of the count of the counter may be reset when the saturation signal is enabled or the soft start end signal is disabled.

The monitoring unit may turn off the switch when a protection operation is triggered.

A power supply device according to an exemplary embodiment includes at least one power switch coupled to a winding on the primary side, at least one synchronization rectification switch configured to generate an output voltage by synchronizing and rectifying a current flowing into a winding on the secondary side, and a switch control circuit configured to control switching operations of the power switch and the synchronization rectification switch and to control protection mode and a protection operation. The switch control circuit may automatically restart the switching operation of the power switch when a result of the count of the cycle of a first signal reaches a protection reference value in a protection condition, count consecutively-generated auto-restarts, and switch protection mode to latch mode when the count of consecutively generated auto-restarts reaches a predetermined threshold number.

The switch control circuit may reset a result of the count of the consecutively generated auto-restarts when a control voltage based on the output voltage is maintained in a normal state during a predetermined monitoring period after a lapse of a soft start period.

The switch control circuit includes a comparator configured to compare the first signal with a first reference voltage and a soft start end detector configured to generate a soft start end signal indicative of a lapse of a soft start period when the first signal reaches a predetermined threshold voltage. The switch control circuit may generate an auto-restart signal indicative of an auto-restart when a result of the count of the output based on the soft start end signal and the output of the comparator reaches the protection reference value.

The switch control circuit may include an error amplifier configured to amplify a difference between a feedback voltage corresponding to the output voltage and a predetermined reference voltage, a switch having a first end coupled to an input terminal of the error amplifier to which the reference voltage is inputted and a capacitor coupled to a second end of the switch for generating the first signal, and a clamping unit configured to clamp a voltage of the input terminal of the error amplifier to the reference voltage. The switch control circuit may generate a control voltage by compensating for the output of the error amplifier and turn off the switch when the control voltage is saturated or the protection operation is triggered.

The switch control circuit includes a counter configured to count the consecutively generated auto-restarts and a comparator configured to compare the count with a latch reference value corresponding to the threshold number. The switch control circuit may reset the count when a control voltage based on the output voltage is maintained in a normal state during a predetermined monitoring period after a lapse of a soft start period.

The switch control circuit may generate a latch mode signal when the count of the consecutively generated auto-restarts reaches a predetermined latch reference value and switch the protection mode to the latch mode based on the latch mode signal and a mode voltage indicative of the latch mode.

Exemplary embodiments provide the protection mode control circuit capable of stably changing protection mode, the switch control circuit including the protection mode control circuit, and the power supply device including the switch control circuit.

DETAILED DESCRIPTION OF THE EMBODIMENTS

The present invention is described more fully hereinafter with reference to the accompanying drawings, in which exemplary embodiments of the present disclosure are shown. As those skilled in the art would realize, the described embodiments may be modified in various different ways, all without departing from the spirit or scope of the present invention. Furthermore, in order to clarify a description of the present invention, a description of parts not related to the description is omitted, and the same reference numbers are used throughout the specification to refer to the same or like parts.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

In the following description, a protection operation means that a switching operation is stopped when an abnormal state, such as an overload, an overcurrent, or an output short-circuit, is detected. A protection state means the state in which the protection operation is triggered and the cause of triggering the protection operation has not been solved.

Figure 1:
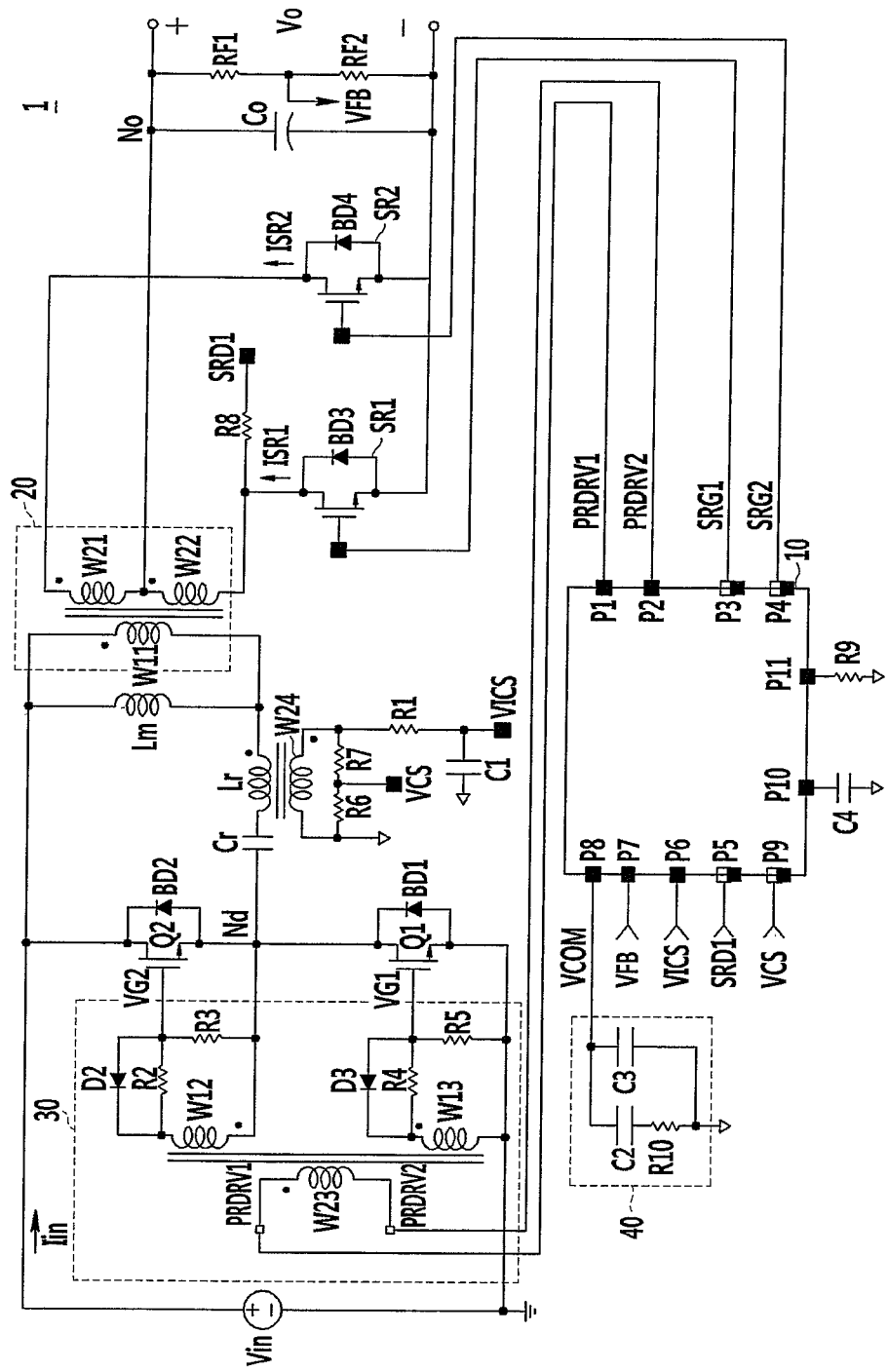
FIG. 1 is a diagram showing a switch control circuit and a power supply device including a protection mode control circuit according to an exemplary embodiment.

FIG. 1 is a diagram showing a switch control circuit and a power supply device including a protection mode control circuit according to an exemplary embodiment.

FIG. 1 shows a resonant converter as an example of the power supply device, but the present invention is not limited thereto. The resonant converter of FIG. 1 is a half-bridge LLC resonant converter. However, converters to which the present invention may be applied are not limited to the half-bridge LLC resonant converter.

The resonant converter 1 includes a first switch Q1, a second switch Q2, a transformer 20, a gate driving circuit 30, a first synchronization rectification switch SR1, a second synchronization rectification switch SR2, and a switch control circuit 10.

Body diodes BD1 and BD2 are formed between the drains and sources of the first switch Q1 and second switch Q2, respectively. The first switch Q1 and second switch Q2 are power switches to control power supply.

The second switch Q2 and the first switch Q1 are connected in series between an input voltage Vin and a primary-side ground. The second switch Q2 and the first switch Q1 alternately switch. After a lapse of a first dead time since the second switch Q2 is turned off, the first switch Q1 is turned on. After a lapse of the first dead time since the first switch Q1 is turned off, the second switch Q2 is turned on.

The drain of the second switch Q2 is connected to the input voltage Vin, the source of the second switch Q2 and the drain of the first switch Q1 are connected at a node Nd, and the source of the first switch Q1 is connected to a ground on the primary side. The gate voltages VG2 and VG1 are supplied to gates of the second switch Q2 and the first switch Q1, respectively. The first switch Q1 and the second switch Q2 alternately perform switching, and the power supply is controlled based on the switching operation. For example, the power supply increases as the switching frequency of the first switch Q1 and the second switch Q2 decreases, and decreases as the switching frequency increases.

A capacitor Cr, a winding W1 on the primary side of the transformer 20, and an inductor Lr are connected in series between the input voltage Vin and the node Nd. Resonance occurs between the capacitor Cr, the primary winding W1, and the inductor Lr. A current "Iin" inputted to the primary side is controlled so that it becomes a sine wave by the resonance.

On the secondary side of the transformer 20, a winding W21 and a winding W22 are coupled to the primary winding W11 in an insulated manner at a predetermined winding ratio. The first synchronization rectification switch SR1 is connected to one end of the winding W22 on the secondary side, and a body diode BD3 is formed between the drain and source of the first synchronization current switch SR1. The second synchronization rectification switch SR2 is connected to one end of the winding W21 on the secondary side, and a body diode BD4 is formed between the drain and source of the second synchronization rectification switch SR2.

Hereinafter, the meaning that a current flows through the first and the second synchronization rectification switches SR1 and SR2 includes that the current flows when the first and the second synchronization rectification switches SR1 and SR2 are turned on and that the current flows through the body diodes BD3 and BD4.

The source of the first synchronization rectification switch SR1 is connected to a ground on the secondary side, and the drain of the first synchronization rectification switch SR1 is connected to the winding W22 on the secondary side, and a first gate voltage SRG1 is inputted to the gate of the first synchronization rectification switch SR1. The source of the second synchronization rectification switch SR2 is connected to the ground on the secondary side, and the drain of the second synchronization rectification switch SR2 is connected to one end of the winding W21 on the secondary side, and a second gate voltage SRG2 is inputted to the gate of the second synchronization rectification switch SR2.

The other end of the winding W21 and the other end of the winding W22 are connected to an output node No. A capacitor Co is connected between the output node No and the ground on the secondary side. The voltage of the output node No becomes an output voltage Vo.

The body diode BD3 becomes conductive by a current flowing into the winding W22 on the secondary side, and thus the first synchronization rectification switch SR1 is turned on. In response thereto, the current of the winding W22 on the secondary side is rectified by the first synchronization rectification switch SR1, thus flowing into the capacitor Co. The current flowing through the first synchronization current switch SR1 is hereinafter called a first synchronization rectification current ISR1.

The body diode BD4 becomes conductive by a current flowing into the winding W21 on the secondary side, and thus the second synchronization rectification switch SR2 is turned on. In response thereto, the current of the winding W21 on the secondary side is rectified by the second synchronization rectification switch SR2, thus flowing into the capacitor Co. The current flowing through the second synchronization current switch SR2 is hereinafter called a second synchronization rectification current ISR2.

The first and the second synchronization rectification currents ISR1 and ISR2 may be supplied to a load or may charge the capacitor Co. A ripple of the output voltage Vo is attenuated by the capacitor Co.

The gate driving circuit 30 includes a winding W23 on the secondary side, two windings W12 and W13 on the primary side, four resistors R2-R5, and two diodes D2 and D3.

A first driving voltage PRDRV1 is inputted to one end of the winding W23 on the secondary side, and a second driving voltage PRDRV2 is inputted to the other end of the winding W23 on the secondary side. The resistor R2 and the diode D2 are connected in parallel between one end of the winding W12 on the primary side and the gate of the second switch Q2. The other end of the winding W12 on the primary side is connected to one end of the resistor R3 and the node Nd. The resistor R2, the resistor R3, and the anode of the diode D2 are connected to the gate of the second switch Q2. The resistor R4 and the diode D3 are connected in parallel between one end of the winding W13 on the primary side and the gate of the first switch Q1. The other end of the winding W13 on the primary side is connected to one end of the resistor R5 and the ground on the primary side. The resistor R4, the resistor R5, and the anode of the diode D3 are connected to the gate of the first switch Q1.

The first switch Q1 performs a switching operation in response to the gate voltage VG1, and the second switch Q2 performs a switching operation in response to the gate voltage VG2. Since the first switch Q1 and the second switch Q2 are n channel transistors, an enable level of each of the gate voltage VG1 and the gate voltage VG2 is a high level, and a disable level is a low level.

When the first driving voltage PRDRV1 is a high level and the second driving voltage PRDRV2 is a low level, the current of the winding W12 on the primary side flows through the resistor R3 and the diode D2, and the current of the winding W13 on the primary side flows through the resistor R4 and the resistor R5. Accordingly, the gate voltage VG1 becomes a high-level voltage capable of turning on the first switch Q1, and thus the first switch Q1 is turned on. The gate voltage VG2 becomes a voltage lower than the source voltage of the second switch Q2, and thus the second switch Q2 is turned off.

When the second driving voltage PRDRV2 is a high level and the first driving voltage PRDRV2 is a low level, the current of the winding W12 on the primary side flows through the resistor R2 and the resistor R3, and the current of the winding W13 on the primary side flows through the resistor R5 and the diode D3. Accordingly, the gate voltage VG2 becomes a high-level voltage capable of turning on the second switch Q2, and thus the second switch Q2 is turned on. The gate voltage VG1 becomes a voltage lower than the source voltage of the first switch Q1, and thus the first switch Q1 is turned off.

When the input current "Iin" flows into the inductor Lr, a current is induced to the winding W24 on the secondary side, thereby generating a detection voltage VCS. For example, when the input current "Iin" flows toward the node Nd from the inductor Lr by a resonance, the current of the winding W24 on the secondary side flows into the ground on the secondary side through the resistor R7 and the resistor R6. In response thereto, a positive detection voltage VCS corresponding to the input current "Iin" is generated. When the input current "Iin" flows from the node Nd to the inductor Lr by a resonance, the current of the winding W24 on the secondary side flows through the resistor R6 and the resistor R7 from the ground on the secondary side. Accordingly, a negative detection voltage VCS corresponding to the input current "Iin" is generated. The detection voltage VCS is supplied to the switch control circuit 10 through a pin P9. The switch control circuit 10 may detect an overcurrent using the detection voltage VCS.

The resistor R1 is connected to one end of the winding W24 on the secondary side, and the other end of the resistor R1 is connected to one end of the capacitor C1 and a pin P6. The other end of the capacitor C1 is connected to the ground on the secondary side. A voltage corresponding to a current flowing into the winding W24 on the secondary side is integrated by through an RC filter including a resistor R1 and the capacitor C1. The result of the integration is information corresponding to a current supplied to a load (hereinafter called a "load current"). The result of the integration is a voltage for detecting a load and is hereinafter called a current detection voltage VICS.

The switch control circuit 10 includes a pin P1 from which a first driving voltage PRDRV1 is output, a pin P2 from which a second driving voltage PRDRV2 is output, a pin P3 from which the first gate voltage SRG1 is output, a pin P4 from which the second gate voltage SRG2 is output, a pin P5 to which the first drain voltage SRD1 is inputted, the pin P6 to which the current detection voltage VICS is inputted, a pin P7 to which a feedback voltage VFB is inputted, a pin P8 to which a compensator is connected, a pin P9 to which the detection voltage VCS is inputted, a pin P10 to which a capacitor C4 for generating a soft start voltage is connected, and a pin P11 to which a resistor R9 for selecting protection mode is connected.

The pin P5 is connected to the drain of the first synchronization rectification switch SR1 through a resistor R8. The pin P7 is connected to a node to which the two resistors RF1 and RF2 are connected. The output voltage Vo is divided by the two resistors RF1 and RF2, thereby generating the feedback voltage VFB.

The compensator 40, including a resistor R10, a capacitor C2, and a capacitor C3, is connected to the pin P8. The capacitor C3 is connected in parallel to the resistor R10 and the capacitor C2 that are connected in series. One electrode of the capacitor C2 and one electrode of the capacitor C3 are connected to the pin P8. One end of the resistor R10 is connected to the other end of the capacitor C2, and the other end of the resistor R10 and the other electrode of the capacitor C3 are connected to the ground on the secondary side.

The switch control circuit 10 generates an error voltage by amplifying a difference between the feedback voltage VFB and a predetermined reference voltage. The error voltage is compensated for by the compensator 11, thereby generating a control voltage VCOMP. The switch control circuit 10 generates first and second clock signals using the control voltage VCOMP and the current detection voltage VICS received through the pin P6 and controls the switching operations of the first and the second switches Q1 and Q2, respectively, in response to the first and the second clock signals.

For example, the switch control circuit 10 may turn on the first switch Q1 at a point of time delayed from the rising edge of the first clock signal by a dead time and turn off the first switch Q1 at the falling edge of the first clock signal. The switch control circuit 10 may turn on the second switch Q2 at a point of time delayed from the rising edge of the second clock signal by a dead time and turn off the second switch Q2 at the falling edge of the second clock signal.

The switch control circuit 10 turns on the first synchronization rectification switch SR1 in synchronization with the turn-on of the first switch Q1 and turns on the second synchronization rectification switch SR2 in synchronization with the turn-on the second switch Q2. The switch control circuit 10 maintains the first and the second synchronization rectification switches SR1 and SR2 during a predetermined on period and turns off them.

For example, the switch control circuit 10 may determine the on period of each of the first and the second synchronization rectification switches SR1 and SR2 based on a conduction period in the immediately previous switching cycle of each of the first and the second synchronization rectification switches SR1 and SR2.

The switch control circuit 10 may determine the on period of a current switching cycle by subtracting a predetermined margin from a conduction period in the immediately previous switching cycle of each of the first and the second synchronization rectification switches SR1 and SR2. The conduction period in the immediately previous switching cycle of each of the first and the second synchronization rectification switches SR1 and SR2 means a period from a point of time at which each of the body diodes BD3 and BD4 connected to the first and the second synchronization rectification switches SR1 and SR2, respectively, becomes conductive to a point of time at which each of the body diodes BD3 and BD4 is blocked. A dead time is present between the on periods of the first and the second synchronization rectification switches SR1 and SR2.

Such a method of controlling the switching of the first and the second synchronization rectification switches SR1 and SR2 is only an example, and the invention is not limited thereto.

The protection mode control circuit 100 of the switch control circuit 10 switches protection mode to latch mode when auto-restarts are consecutively generated by a predetermined number, on the condition that the mode voltage VM indicative of protection mode is a voltage corresponding to latch mode. For example, in a protection condition in which a protection operation has been triggered, the protection mode control circuit 100 counts the cycle of a signal, generates a signal indicative of an auto-restart when the result of the count reaches a predetermined value, and switches protection mode to latch mode when the signal indicative of an auto-restart is consecutively generated by a predetermined number.

When a protection operation is triggered, the switching operations of the first and the second switches Q1 and Q2 of the power supply device 1 are stopped. Auto-restart mode is protection mode in which a switching operation is restarted after a lapse of a predetermined protection period since a protection operation is triggered. In latch mode, a switching operation stop state is maintained after a protection operation is triggered.

In accordance with auto-restart mode, when an abnormal state that is the cause of a protection operation is solved, the switching operation of the power supply device 1 is normally controlled. In accordance with latch mode, although an abnormal state that is the cause of a protection operation is solved, a separate trigger for starting the switching operation of the power supply device 1 is required.

Figure 2:
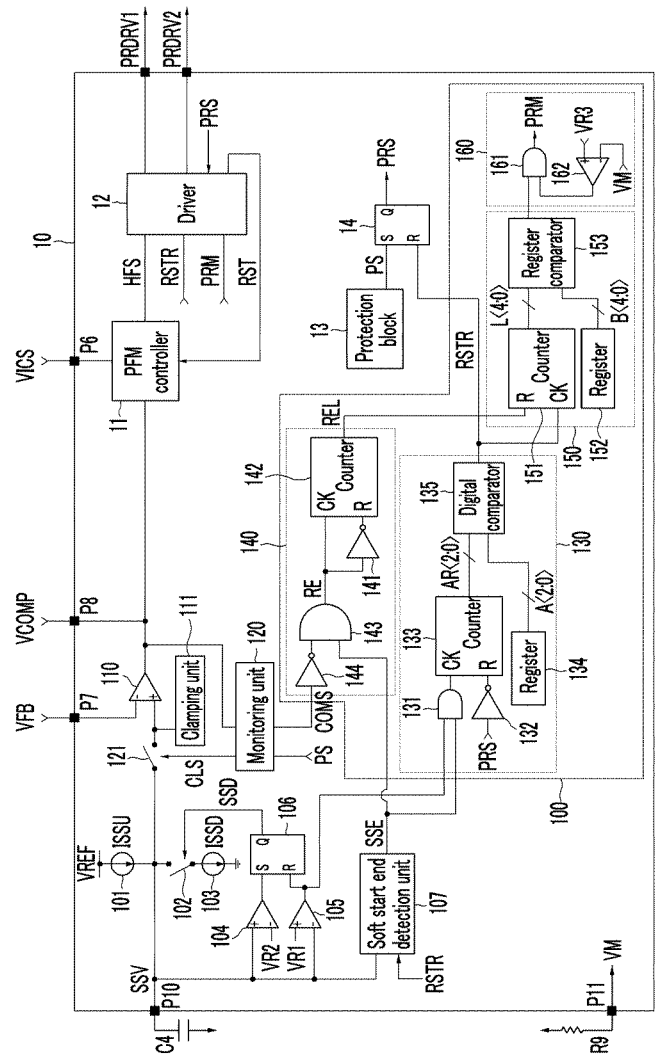
FIG. 2 is a diagram showing the configuration of part of a switch control circuit including the protection mode control circuit according to an exemplary embodiment.

FIG. 2 is a diagram showing the configuration of part of a switch control circuit including the protection mode control circuit according to an exemplary embodiment.

The protection mode control circuit 100 according to an exemplary embodiment includes an auto-restart counter 130, a latch reset unit 140, a latch mode unit 150, and a protection mode controller 160.

A pulse frequency modulation (PFM) controller 11 generates a half-cycle signal HFS based on the result of a comparison between the control voltage VCOMP and a signal obtained by adding the current detection voltage VICS to a signal for controlling a switching frequency. The signal for controlling a switching frequency has a triangle wave and may be a signal which is increased at a predetermined slope during the on period of the first switch Q1.

A driver 12 generates the first and the second clock signals based on the half-cycle signal HFS and generates the first and the second driving voltages PRDRV1 and PRDRV2 based on the first and the second clock signals and the dead time of the first and the second switches Q1 and Q2.

The driver 12 may decrease the first clock signal and increase the second clock signal in synchronization with the rising edge of the half-cycle signal HFS and may increase the first clock signal and decrease the second clock signal at a point of time after a lapse of the period in which the first clock signal is enabled in a immediately previous switching cycle from the point of time of the rising edge of the half-cycle signal HFS.

The driver 12 may increase the first driving voltage PRDRV1 to a high level at a point of time delayed from the rising edge of the first clock signal by a dead time and may decrease the second driving voltage PRDRV2 to a low level at the falling edge of the second clock signal. The driver 12 may increase the second driving voltage PRDRV2 to a high level at a point of time delayed from the rising edge of the second clock signal by a dead time and may decrease the first driving voltage PRDRV1 to a low level at the falling edge of the first clock signal.

The driver 12 may generate an initialization signal RST for each switching cycle and send the initialization signal RST to the PFM controller 11. The PFM controller 11 may reset the triangle wave in response to the initialization signal RST.

A protection block 13 detects the generation of an abnormal state, such as an overcurrent, an overload, overheating, or overshoot. When the protection block 13 detects an abnormal state, it generates a protection start signal PS. An SR latch 14 generates a protection signal PRS in synchronization with the protection start signal PS inputted to the set terminal S of the SR latch 14. The protection signal PRS is reset by an auto-restart signal RSTR inputted to the reset terminal R of the SR latch 14.

An error amplifier 110 amplifies a difference between the feedback voltage VFB and the reference voltage VR and outputs the difference. Output of the error amplifier 110 is compensated by the compensator 40, thereby generating the control voltage VCOMP.

The clamping unit 111 clamps the reference voltage VR to a predetermined voltage. A switch 121 performs a switching operation in response to output of the monitoring unit 120. During the on period of the switch 121, a soft start voltage SSV is clamped by the clamping unit 111, thus becoming the reference voltage VR.

The switch 121 may be in a turn-off state during a soft start period and may be turned on after the soft start period is ended. Furthermore, when the control voltage VCOMP is saturated due to an overload or a protection operation is triggered, the switch 121 may be turned off. When the control voltage VCOMP deviates from the saturation state or the protection operation is ended, the switch 121 may be turned on again.

A monitoring unit 120 detects the saturation of the control voltage VCOMP by monitoring the control voltage VCOMP and generates a switching signal CLS for controlling the switch 121 based on the protection start signal PS and whether the saturation of the control voltage VCOMP is detected or not.

For example, when the control voltage VCOMP rises to predetermined saturation threshold voltage or more, the monitoring unit 120 determines the control voltage VCOMP to be saturated and generates the switching signal CLS for turning off the switch 121. At this time, the monitoring unit 120 may generate a saturation signal COMS of a high level indicative of saturation along with the switching signal CLS.

The monitoring unit 120 generates the switching signal CLS for turning on the switch 121 after the control voltage VCOMP becomes a voltage lower than a saturation threshold voltage. At this time, the monitoring unit 120 may generate the saturation signal COMS of a low level together with the switching signal CLS.

Furthermore, the monitoring unit 120 generates the switching signal CLS for turning off the switch 121 when the protection start signal PS is enabled and generates the switching signal CLS for turning on the switch 121 when the protection state is ended.

A current source 101 supplies a source current ISSU to a capacitor C4 so that the soft start voltage SSV rises. A switch 102 is connected between a current source 103 and the capacitor C4. During the on period of the switch 102, the current source 103 reduces the soft start voltage SSV by sinking the sink current ISSD from the capacitor C4. In an exemplary embodiment, the auto-restart signal RSTR is generated based on a result of the count of the cycle of the soft start voltage SSV, but the invention is not limited thereto. Another signal capable of counting a cycle may be used.

A comparator 104 generates an output based on the result of a comparison between the soft start voltage SSV and a reference voltage VR2. The comparator 104 outputs a high level when the soft start voltage SSV is the reference voltage VR2 or higher and outputs a low level when the soft start voltage SSV is lower than the reference voltage VR2.

A comparator 105 generates an output SSI based on the result of a comparison between the soft start voltage SSV and a reference voltage VR1. The output of the comparator 105 is hereinafter called a soft start initialization signal SSI. The comparator 105 outputs the soft start initialization signal SSI of a high level when the soft start voltage SSV is the reference voltage VR1 or lower and outputs the soft start initialization signal SSI of a low level when the soft start voltage SSV is higher than the reference voltage VR2. The soft start initialization signal SSI is generated for each cycle of the soft start voltage SSV. The protection mode control circuit 100 may determine an auto-restart point in auto-restart mode by counting the pulse of the soft start initialization signal SSI.

An SR latch 106 includes a set terminal S to which the output of the comparator 104 is inputted and a reset terminal R to which the soft start initialization signal SSI is inputted and outputs the switching signal SSD through its output terminal Q. The SR latch 106 generates a switching signal SSD of a high level in synchronization with the rising edge of a signal inputted to the set terminal S and generates the switching signal SSD of a low level in synchronization with the rising edge of a signal inputted to the reset terminal R.

For example, the reference voltage VR2 may be higher than the reference voltage VR1. When the soft start voltage SSV is increased by the source current ISSU and reaches the reference voltage VR2, the output of the comparator 104 rises. The SR latch 106 outputs the switching signal SSD of a high level in response to the rising edge of the output of the comparator 104. In response thereto, the switch 102 is turned on, and the soft start voltage SSV is reduced by the sink current ISSD. When the reduced soft start voltage SSV reaches the reference voltage VR1, the soft start initialization signal SSI, that is, the output of the comparator 105, increases. The SR latch 106 outputs the switching signal SSD of a low level in response to the rising edge of the soft start initialization signal SSI. In response thereto, the switch 102 is turned off, and the soft start voltage SSV is increased by the source current ISSU.

Figure 3:
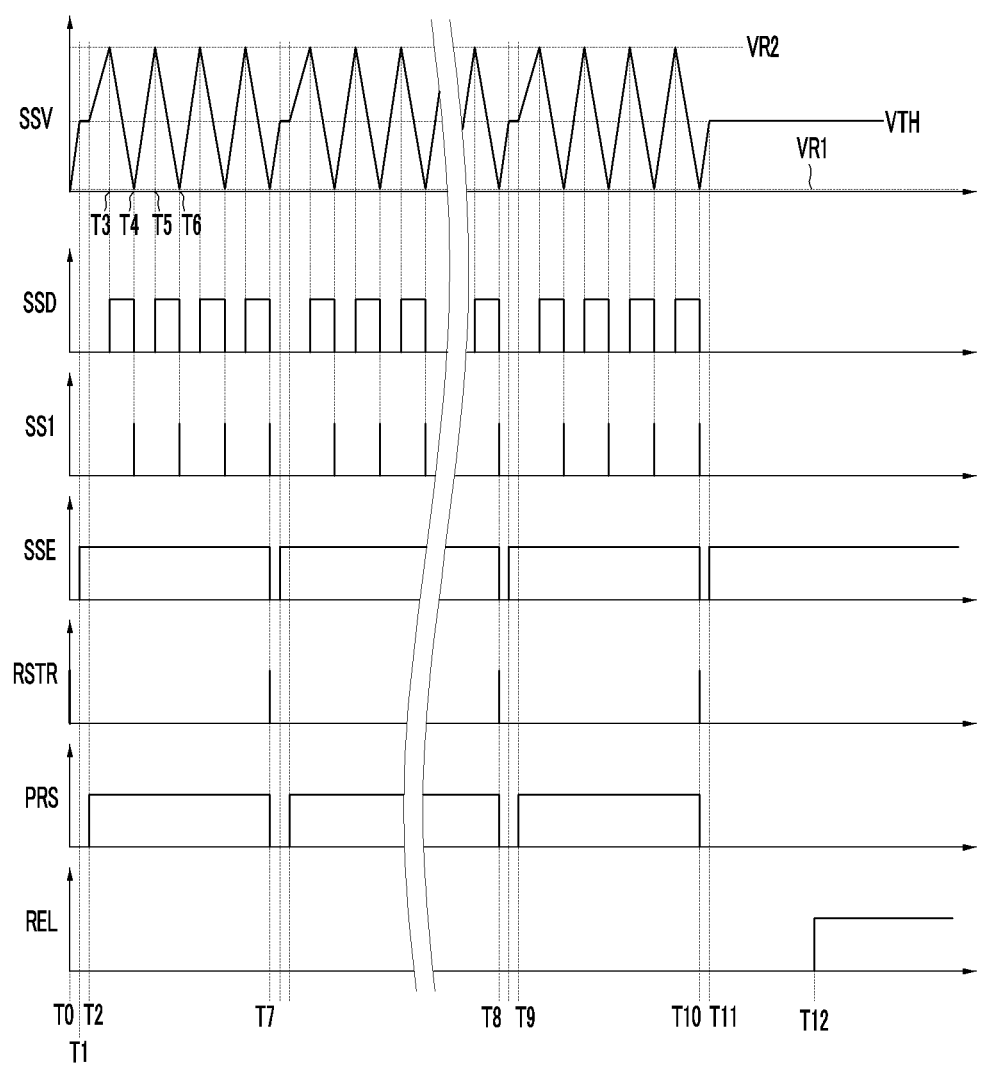
FIG. 3 is a diagram illustrating the operation of the protection mode control circuit.

A soft start end detector 107 determines that a soft start has ended when the soft start voltage SSV reaches a predetermined threshold voltage VTH after starting to increase (refer to FIG. 3). For example, the soft start end detector 107 outputs a soft start end signal SSE of a high level from a point of time at which a soft start has ended and outputs the soft start end signal SSE of a low level during a soft start period. The soft start end detector 107 may decrease the soft start end signal SSE by the auto-restart signal RSTR.

The auto-restart counter 130 counts the pulse of the soft start initialization signal SSI when a protection operation is triggered, maintains the protection operation during a predetermined protection period, and generates the auto-restart signal RSTR for automatically restarting a switching operation when the protection period elapses. For example, when the number of counted pulses of the soft start initialization signal SSI reaches a predetermined protection reference value, the auto-restart counter 130 generates the auto-restart signal RSTR of a high level for enabling an auto-restart.

The auto-restart counter 130 includes an AND gate 131, an inverter 132, a counter 133, a register 134, and a digital comparator 135.

The AND gate 131 performs AND operation on the soft start end signal SSE and the soft start initialization signal SSI and outputs the result of the operation. For example, if the soft start end signal SSE and the soft start initialization signal SSI are high level, the AND gate 131 outputs a high level. The soft start initialization signal SSI is a pulse signal because the soft start voltage SSV falls to the reference voltage VR1 and then rises. Accordingly, a soft start period is ended and the soft start end signal SSE is a high level, and whenever the pulse of the soft start initialization signal SSI is generated, the AND gate 131 may output a pulse.

The inverter 132 inverts a protection signal PRS and outputs the inverted protection signal. The counter 133 resets a result of count when the output of the inverter 132 is a high level.

The counter 133 counts a signal inputted to the input terminal CK of the counter 133 and outputs the result of the count. For example, the counter 133 counts the pulse of the input terminal CK and resets the result of the count when the input of the input terminal R of the counter 133 is a high level. When the protection signal PRS becomes a high level, an inverted protection signal PRS is inputted to the input terminal R of the counter 133. The counter 133 counts the pulse of the input terminal CK. When the protection signal PRS becomes a low level, the inverted protection signal PRS is inputted to the input terminal R of the counter 133. The counter 133 resets a result of count.

A register 134 stores a reference value A<2:0> for controlling a protection period.

In FIG. 2, the output of the counter 133 and the reference value stored in the register 134 have been illustrated as being the digital signals AR<2:0> and A<2:0> of 3 bits, but the invention is not limited thereto. Each of the output of the counter 133 and the reference value stored in the register 134 may be a digital signal having a proper number of bits depending on a protection period.

The digital comparator 135 compares the output AR<2:0> of the counter 133 with the reference value A<2:0> and outputs the auto-restart signal RSTR indicative of an auto-restart when the output AR<2:0> reaches the reference value A<2:0>. For example, the auto-restart signal RSTR indicative of an auto-restart may be a high level.

If the control voltage VCOMP is maintained in a normal state during a predetermined monitoring period after a lapse of a soft start period, the latch reset unit 140 resets a latch count result. The state in which the control voltage VCOMP has not been saturated is called the normal state.

The latch mode unit 150 counts the auto-restart signal RSTR, switches protection mode to latch mode when a result of the count reaches a predetermined latch reference value, and resets the result of the count under the control of the latch reset unit 140. If the control voltage VCOMP deviates from a saturation state before the count result of the latch mode unit 150 reaches the latch reference value, the count result of the latch mode unit 150 may be reset.

The latch reset unit 140 includes two inverters 141 and 144, a counter 142, and an AND gate 143.

The inverter 144 inverts the saturation signal COMS and outputs the inverted saturation signal. The AND gate 143 generates a reset signal RE by performing AND operation on the soft start end signal SSE and the output of the inverter 144. After a soft start period is ended, when the saturation signal COMS becomes a low level, the AND gate 143 outputs the reset signal RE of a high level.

The inverter 141 inverts the reset signal RE and outputs the inverted reset signal.

The counter 142 counts the input of the input terminal CK of the counter 142 and resets the result of the count based on the input of the input terminal R of the counter 142. For example, the counter 142 may count the period in which the input of the input terminal CK is a high level and output a reset latch signal REL of a high level when a result of the count reaches a value corresponding to a predetermined monitoring period (refer to T11-T12 of FIG. 3).

The counter 142 resets a result of count when the input of the input terminal R is a high level. When the control voltage VCOM is saturated, the count result of the counter 142 is reset. In some embodiments, when the soft start end signal SSE becomes a low level, the count result of the counter 142 is reset. For example, the auto-restart signal RSTR rises to a high level and a soft start is triggered. And the soft start end signal SSE becomes a low level, the count result of the counter 142 is reset.

The latch mode unit 150 includes a counter 151, a register 152, and a digital comparator 153.

The counter 151 counts the input of the input terminal CK of the counter 151 and outputs the result of the count. The counter 151 resets a result of count based on the input of the input terminal R of the counter 151. For example, the counter 151 generates a digital signal L<4:0> of 5 bits based on the result of the count of the rising edge of the input terminal CK. The counter 151 resets the result of count in response to the reset latch signal REL of a high level.

The register 152 stores a threshold value for changing protection mode. When a result of the count of the counter 151 reaches the threshold value, protection mode switches from auto-restart mode to latch mode.

In FIG. 2, the output of the counter 151 and a latch reference value stored in the register 152 have been illustrated as being the digital signals L<4:0> and B<4:0> of 5 bits, but the invention is not limited thereto. Each of the output of the counter 151 and the latch reference value stored in the register 152 may be a digital signal having a proper number of bits depending on the design.

The digital comparator 153 compares the output L<4:0> of the counter 151 with the latch reference value B<4:0> and outputs a latch mode signal LMS indicative of the start of latch mode when the output L<4:0> reaches the latch reference value B<4:0>. For example, the latch mode signal LMS indicative of latch mode may be a high level.

The protection mode controller 160 determines protection mode based on the mode voltage VM and the latch mode signal LMS and generates a protection mode signal PRM indicative of protection mode. The protection mode controller 160 includes an AND gate 161 and a comparator 162.

The comparator 162 may control protection mode based on the result of a comparison between a reference voltage VR3 and the mode voltage VM received through the pin P11. For example, a predetermined current source (not shown) is connected to the pin P11, and the mode voltage VM is determined by a current flowing into the resistor R9. A user may change the mode voltage VM by controlling the resistance value of the resistor R9 connected to the pin P11. The mode voltage VM is inputted to the inverting terminal − of the comparator 162, and the reference voltage VR3 is inputted to the non-inverting terminal + thereof.

When the mode voltage VM is higher than the reference voltage VR3, the comparator 162 outputs a low level. The AND gate 161 generates the protection mode signal PRM indicative of auto-restart mode in response to the low-level output of the comparator 162. The level of the protection mode signal PRM indicative of auto-restart mode may be a low level.

When the mode voltage VM is the reference voltage VR3 or lower, the comparator 162 outputs a high level. The AND gate 161 generates the protection mode signal PRM in response to the latch mode signal LMS in the high-level output condition of the comparator 162. The level of the protection mode signal PRM indicative of latch mode may be a high level.

The driver 12 may drive a protection operation in response to the protection mode signal PRM. For example, in auto-restart mode, that is, in a condition in which the protection mode signal PRM is a low level, the driver 12 may restart a switching operation in response to the auto-restart signal RSTR and stop the switching operation in response to the protection signal PRS. In contrast, in latch mode, that is, in a condition in which the protection mode signal PRM is a high level, the driver 12 may maintain a switching operation stop state regardless of the auto-restart signal RSTR.

The operation of the protection mode control circuit 100 according to an exemplary embodiment is described below with reference to FIGS. 3 and 4.

FIG. 3 is a diagram illustrating the operation of the protection mode control circuit.

For example, at a point of time T0, the pulse of the auto-restart signal RSTR is generated, and the switching operations of the first and the second switches Q1 and Q2 are started. A soft start operation is started from the point of time T0, and the soft start voltage SSV starts to increase by the source current ISSU. At a point of time T1, the increasing soft start voltage SSV reaches the threshold voltage VTH. Accordingly, the soft start end detector 107 increases the soft start end signal SSE to a high level in synchronization with the point of time T1.

It is assumed that a protection operation is triggered at a point of time T2. Accordingly, at the point of time T2, the protection start signal PS increases and the protection signal PRS rises to a high level, and thus the driver 12 stops the switching operations. The soft start voltage SSV is maintained at the threshold voltage VTH by the clamping unit 111, and it starts to increase again from the point of time T2 at which the switch 121 is turned off.

At a point of time T3, when the increasing soft start voltage SSV reaches the reference voltage VR2, the switching signal SSD rises to a high level and the switch 102 is turned on. In response thereto, the soft start voltage SSV starts to decrease by the sink current ISSD.

At a point of time T4, when the decreasing soft start voltage SSV reaches the reference voltage VR1, the switching signal SSD decreases to a low level and the switch 102 is turned off. Accordingly, the soft start voltage SSV starts to increase by the source current ISSU. At this time, the soft start initialization signal SSI is generated in a pulse form.

At the point of time T4, the AND gate 131 outputs the pulse of a high level as a result of the AND operation of the soft start end signal SSE and the soft start initialization signal SSI, and the counter 133 counts the pulse of a high level.

At a point of time T5, when the increasing soft start voltage SSV reaches the reference voltage VR2, the switching signal SSD rises to a high level and the switch 102 is turned on. Accordingly, the soft start voltage SSV starts to decrease by the sink current ISSD.

At a point of time T6, when the decreasing soft start voltage SSV reaches the reference voltage VR1, the switching signal SSD decreases to a low level and the switch 102 is turned off. Accordingly, the soft start voltage SSV starts to increase again by the source current ISSU. At this time, the soft start initialization signal SSI is generated in a pulse form.

At the point of time T6, the AND gate 131 outputs the pulse of a high level as a result of the AND operation of the soft start end signal SSE and the soft start initialization signal SSI and the counter 133 counts the pulse of a high level.

As described above, as the soft start voltage SSV increases or decreases, the soft start initialization signal SSI is generated in a pulse form, and the counter 133 counts the pulse of the soft start initialization signal SSI. For example, it is assumed that the reference value A<2:0> stored in the register 134 is 4.

Accordingly, at a point of time T7 at which the fourth pulse of the soft start initialization signal SSI is generated, the output AR<2:0> of the counter 133 becomes equal to the reference value A<2:0>, and the digital comparator 135 generates the auto-restart signal RSTR in a pulse form. The SR latch 14 decreases the protection signal PRS to a low level in response to the input of the pulse to the reset terminal R. The counter 151 counts the pulse of the auto-restart signal RSTR.

As described above, the protection operation triggered at the point of time T2 is ended at the point of time T7. The switching operations of the first and the second switches Q1 and Q2 are started again in response to the auto-restart signal RSTR from the point of time T7.

An operation after the point of time T7 is the same as the aforementioned operation during the period T0-T7. The counter 151 counts the number of times that the pulse of the auto-restart signal RSTR has been generated. The period from the point of time at which the soft start voltage SSV starts to increase to the point of time at which the fourth pulse of the soft start initialization signal SSI is generated, as in the period T0-T7, is a protection period.

In order to help understanding of an exemplary embodiment, it is assumed that a mode voltage VM is a voltage that is lower than the reference voltage VR3, and is indicative of latch mode, and that the output of the comparator 162 is a high level. It is assumed that the latch reference value B<4:0> stored in the register 152 is 15. Furthermore, it is assumed that the cause of the protection operation has been solved at any point of time between a point of time T9 and a point of time T11. Furthermore, it is assumed that the pulse of the auto-restart signal RSTR generated in synchronization with a point of time T8 is a ninth pulse.

As shown in FIG. 3, the switching operations of the first and the second switches Q1 and Q2 are started in response to the pulse of the auto-restart signal RSTR synchronized with the point of time T8. The soft start voltage SSV starts to increase from the point of time T8. At a point of time T10, the fourth pulse of the soft start initialization signal SSI is generated.

The switching operations of the first and the second switches Q1 and Q2 are started in response to the tenth pulse of the auto-restart signal RSTR synchronized with the point of time T10. At the point of time T10, the soft start voltage SSV starts to increased. The tenth pulse of the auto-restart signal RSTR generated in synchronization with the point of time T10 is counted by the counter 151.

At the point of time T11, the increasing soft start voltage SSV reaches the threshold voltage VTH. Since the protection operation has been solved and the switch 121 has been turned on, the soft start voltage SSV is clamped to the reference voltage VR. In an exemplary embodiment, the reference voltage VR and the threshold voltage VTH are assumed to have the same level. Since the control voltage VCOM becomes a normal state along with the solving of the protection operation, the saturation signal COMS has a low level from any point of time of the period T9-T11.

At the point of time T11, when the soft start end signal SSE rises to a high level, the reset signal RE of a high level is inputted to the input terminal CK of the counter 142, and the counter 142 counts the high level of the reset signal RE. When the period in which the reset signal RE has a high level reaches a monitoring period T11-T12, the counter 142 increases the reset latch signal REL to a high level.

Accordingly, a result of the count of the counter 151 is reset. Since a result of the count before the reset is 10, the latch mode signal LMS that is the output of the digital comparator 153, has a low level and the protection mode signal PRM also has a low level.

That is, protection mode is not switched and maintains auto-restart mode.

An example in which protection mode switches to latch mode is described below with reference to FIG. 4.

Figure 4:
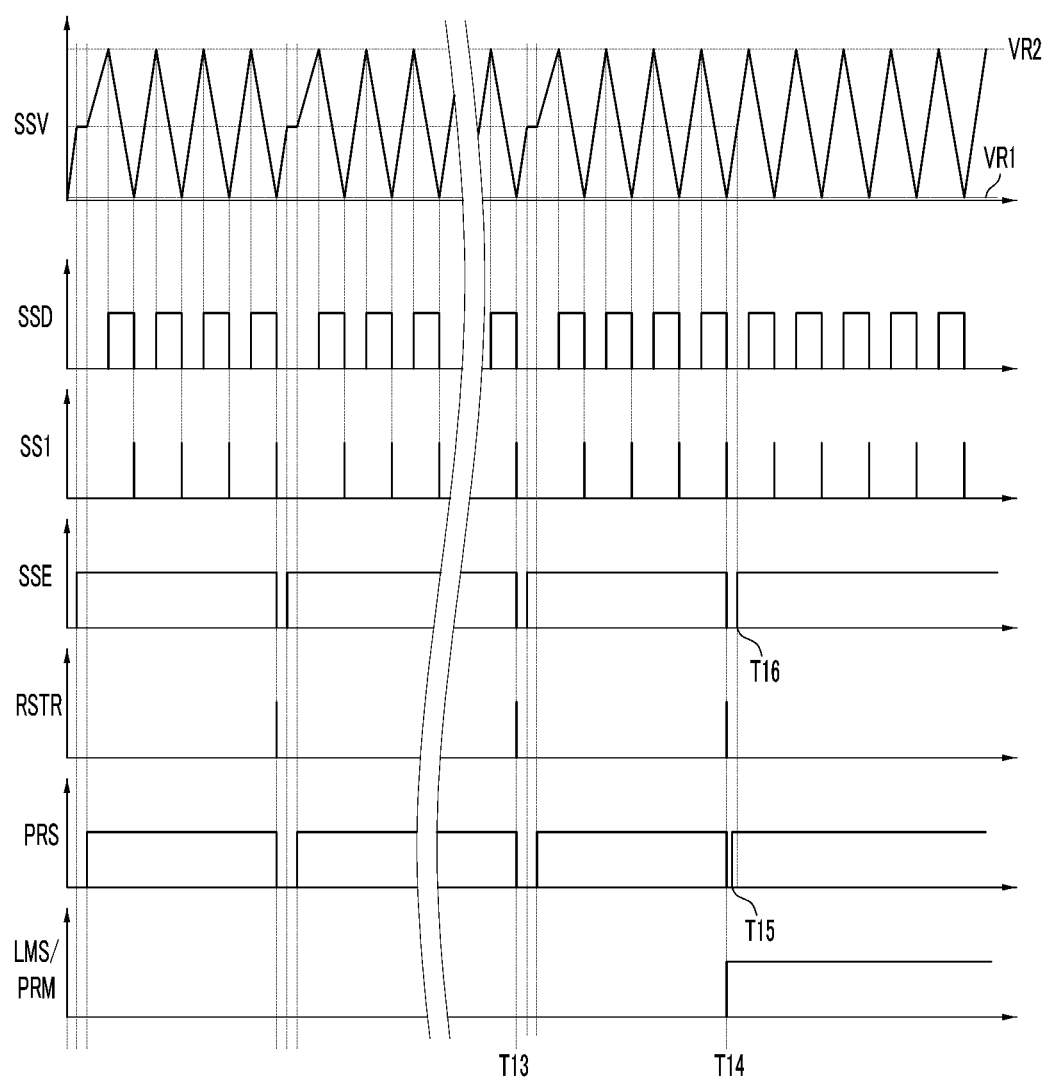
FIG. 4 is a diagram illustrating an operation of switching to latch mode by the protection mode control circuit.

FIG. 4 is a diagram illustrating an operation of switching to latch mode by the protection mode control circuit.

In order to help understanding of an exemplary embodiment, it is assumed that a mode voltage VM is a voltage that is lower than the reference voltage VR3, and is indicative of latch mode, and that the output of the comparator 162 is a high level. It is assumed that the latch reference value B<4:0> stored in the register 152 is 15. Furthermore, it is assumed that the pulse of the auto-restart signal RSTR generated in synchronization with a point of time T13 is a fourteenth pulse.

As shown in FIG. 4, the switching operations of the first and the second switches Q1 and Q2 are started in response to the pulse of the auto-restart signal RSTR synchronized with the point of time T13. The soft start voltage SSV starts to increase from the point of time T13. At a point of time T14, the fourth pulse of the soft start initialization signal SSI is generated.

The switching operations of the first and the second switches Q1 and Q2 are started in response to the fifteenth pulse of the auto-restart signal RSTR synchronized with the point of time T14. The fifteenth pulse of the auto-restart signal RSTR generated in synchronization with the point of time T14 is counted by the counter 151. The digital comparator 153 generates the latch mode signal LMS of a high level because the output L<4:0> of the counter 151 is the same as the latch reference value B<4:0>. At the point of time T14, the AND gate 161 outputs the protection mode signal PRM of a high level which is indicative of latch mode.

At a point of time T15, in the state in which the cause of the protection operation has not been solved, the protection signal PRS rises to a high level. The driver 12 stops the switching operations of the first and the second switches Q1 and Q2. Furthermore, since protection mode after the point of time T14 is switched to latch mode, the protection operation remains intact unless a separate trigger for resetting latch mode is performed, and thus the switching operations remain stopped.

As shown in FIG. 4, at the point of time T14, the soft start voltage SSV starts to increases. At a point of time T16, the increasing soft start voltage SSV reaches the threshold voltage VTH. At the point of time T16, the soft start end signal SSE may rise to a high level. However, the invention is not limited to the example. The soft start voltage SSV, the switching signal SSD, and the soft start initialization signal SSI after the point of time T14 may have waveforms different from the waveforms of FIG. 4.

As described above, after a user instructs protection mode to switch from auto-restart mode to latch mode, when auto-restarts (e.g., 15 times) are consecutively generated by a predetermined number or the cycles of a protection period are consecutively generated by a predetermined number of cycles, the protection mode control circuit 100 according to an exemplary embodiment may switch from auto-restart mode to latch mode.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A protection mode control circuit, comprising:
   an auto-restart counter configured to count a cycle of a first signal in a protection condition and generate an auto-restart signal when a result of the count of the auto-restart counter reaches a protection reference value; and
   a latch mode unit configured to count consecutively-generated auto-restart signals and generate a latch mode signal to switch protection mode to latch mode when the count of the consecutively-generated auto-restart signals reaches a predetermined threshold number.

2. The protection mode control circuit of claim 1, further comprising a latch reset unit configured to reset a result of the count of the latch mode unit when a control voltage for controlling a switching operation is maintained in a normal state during a predetermined monitoring period after the first signal reaches a predetermined level.

3. The protection mode control circuit of claim 2, wherein the latch reset unit is configured to count the monitoring period and reset a result of the count of the monitoring period when the control voltage is saturated or a soft start is triggered.

4. The protection mode control circuit of claim 1, further comprising a protection mode controller configured to determine the protection mode based on an externally determined mode voltage and the latch mode signal.

5. The protection mode control circuit of claim 1, wherein:
the auto-restart counter is configured to count an output generated based on a soft start end signal indicative of a lapse of a soft start period and a soft start initialization signal generated at a point of time at which the first signal has decreased to a predetermined first reference voltage, and generate the auto-restart signal when a result of the count reaches the protection reference value, and
the soft start end signal is enabled from a point of time at which the first signal reaches a predetermined level.

6. The protection mode control circuit of claim 5, wherein the auto-restart counter comprises:
a first AND gate configured to perform an AND operation on the soft start end signal and the soft start initialization signal;
a first counter configured to count an output of the first AND gate; and
a first digital comparator configured to compare the output of the first counter with the protection reference value,
wherein the output of the first counter and the protection reference value are digital signals each having a predetermined number of bits.

7. The protection mode control circuit of claim 1, wherein the latch mode unit comprises:
a second counter configured to count the auto-restart signal; and
a second digital comparator configured to compare the output of the second counter with a latch reference value corresponding to the threshold number, wherein the output of the second counter and the latch reference value are digital signals each having a predetermined number of bits.

8. A switch control circuit for controlling a switching operation of a power switch for controlling a power supply, the switch control circuit comprising:
a comparator configured to compare a first signal with a first reference voltage; and
a protection mode control circuit configured to generate an auto-restart signal for restarting a switching operation of the power switch when a result of a count of a cycle of the first signal reaches a protection reference value based on an output of the comparator, count consecutively-generated auto-restart signals, and switch protection mode to latch mode when the count of the consecutively-generated auto-restart signals reaches a predetermined threshold number.

9. The switch control circuit of claim 8, wherein:
the switch control circuit is configured to generate a soft start end signal when the first signal increases and reaches a predetermined threshold voltage; and
the protection mode control circuit is configured to count a result of an AND operation on the soft start end signal and an output of the comparator, and generate the auto-restart signal when the count result reaches the protection reference value.

10. The switch control circuit of claim 8, wherein the protection mode control circuit is configured to generate a latch mode signal for switching the protection mode to the latch mode when a result of counting the consecutively generated auto-restart signals reaches a predetermined latch reference value.

11. The switch control circuit of claim 8, wherein the protection mode control circuit is configured to reset a result of count of the consecutively generated auto-restart signals when a control voltage based on an output voltage generated by the power supply is maintained in a normal state during a predetermined monitoring period after a lapse of a soft start period.

12. The switch control circuit of claim 11, further comprising:
a switch having a first end coupled to a capacitor for generating the first signal;
a clamping unit coupled to a second end of the switch; and
a monitoring unit configured to generate a saturation signal and turn off the switch when the control voltage is saturated.

13. The switch control circuit of claim 12, wherein:
the protection mode control circuit comprises a counter configured to count a period in which a reset signal has a first level, the reset signal being based on a soft start end signal generated after a lapse of the soft start period and the saturation signal,
the counter being configured to generate a reset latch signal for resetting a result of the count of the consecutively generated auto-restart signals when the count reaches a value corresponding to the monitoring period, and
the count is reset when the saturation signal is enabled or the soft start end signal is disabled.

14. The switch control circuit of claim 12, wherein the monitoring unit turns off the switch when a protection operation is triggered.

15. A power supply device, comprising:
at least one power switch coupled to a winding on a primary side;
at least one synchronization rectification switch configured to generate an output voltage by synchronizing and rectifying a current flowing through a winding on a secondary side; and
a switch control circuit configured to control switching operations of the at least one power switch and the at least one synchronization rectification switch and to control protection mode and a protection operation,
wherein the switch control circuit is configured to automatically restart the switching operation of the at least one power switch when a result of count of a cycle of a first signal reaches a protection reference value in a protection condition, count consecutively-generated auto-restarts, and switch protection mode to latch mode when the count of consecutively generated auto-restarts reaches a predetermined threshold number.

16. The power supply device of claim 15, wherein the switch control circuit is configured to reset a result of the count of the consecutively generated auto-restarts when a control voltage based on the output voltage is maintained in a normal state during a predetermined monitoring period after a lapse of a soft start period.

17. The power supply device of claim 15, wherein the switch control circuit comprises:
  a comparator configured to compare the first signal with a first reference voltage; and
  a soft start end detector configured to generate a soft start end signal indicative of a lapse of a soft start period when the first signal reaches a predetermined threshold voltage,
  wherein the switch control circuit generates an auto-restart signal indicative of an auto-restart when a result of count of an output based on the soft start end signal and an output of the comparator reaches the protection reference value.

18. The power supply device of claim 15, wherein the switch control circuit comprises:
  an error amplifier configured to amplify a difference between a feedback voltage corresponding to the output voltage and a predetermined reference voltage;
  a switch having a first end coupled to an input terminal of the error amplifier to which the reference voltage is inputted;
  a capacitor coupled to a second end of the switch for generating the first signal; and
  a clamping unit configured to clamp a voltage of the input terminal of the error amplifier to the reference voltage,
  wherein the switch control circuit is configured to generate a control voltage by compensating for an output of the error amplifier, and turn off the at least one switch when the control voltage is saturated or the protection operation is triggered.

19. The power supply device of claim 15, wherein the switch control circuit comprises:
  a counter configured to count the consecutively generated auto-restarts; and
  a comparator configured to compare the count with a latch reference value corresponding to the threshold number,
  wherein the switch control circuit is configured to reset the result of the count when a control voltage based on the output voltage is maintained in a normal state during a predetermined monitoring period after a lapse of a soft start period.

20. The power supply device of claim 15, wherein the switch control circuit is configured to generate a latch mode signal when the count of the consecutively generated auto-restarts reaches a predetermined latch reference value, and switch the protection mode to the latch mode based on the latch mode signal and a mode voltage indicative of the latch mode.

* * * * *